United States Patent [19]
Gotanda

[11] 3,812,492
[45] May 21, 1974

[54] METHOD OF AND APPARATUS FOR CONCENTRIC SUPERVISION AND CONTROL OF ROOMS OR PARTS OF A HOUSE OR A BUILDING

[76] Inventor: Motohiro Gotanda, No. 3-6-29, Inakashiru, Mitakei City, Japan

[22] Filed: Nov. 21, 1972

[21] Appl. No.: 308,308

[30] Foreign Application Priority Data
Dec. 6, 1971 Japan.............................. 46-97782

[52] U.S. Cl................................ 340/409, 340/420
[51] Int. Cl. .......................................... G08b 19/00
[58] Field of Search............ 340/409, 147 R, 167 A, 340/147 PC

[56] References Cited
UNITED STATES PATENTS
3,550,111  12/1970  Ervin ............................ 340/409 X
3,641,539  2/1972   Lesher........................... 340/409 X
3,678,512  7/1972   Fergus ......................... 340/167 A X Primary Examiner—Donald J. Yusko
Attorney, Agent, or Firm—Larson, Taylor & Hinds

[57] ABSTRACT

A system for the supervision of normal or abnormal condition of rooms or parts of a house or a building, elevators, water supply and drainage equipments and motors, or the presence or absence of persons in the rooms. Information derived from each room or compartment is applied to each gate of an input gate group provided in a signal transmission device. The output signal of each gate is generated by scanning said input gate group and is detected in a discriminator circuit to determine whether it is normal or not. A normal signal is forwarded to a signal receiving device without modifying the pulse duration of a pulse generated from a pulse generator in the signal transmission device. For an abnormal signal, the duration of a pulse generated by the pulse generator is increased. The signal delivered to the signal receiving device from the signal transmission device is again discriminated in a discriminator circuit to determine whether it is normal or not. The output obtained is indicated on an indicator provided to respond to an information receiving means in the signal transmission device indicating whether the signal either normal or not according to the order of scanning by the signal transmission device.

7 Claims, 6 Drawing Figures

METHOD OF AND APPARATUS FOR CONCENTRIC SUPERVISION AND CONTROL OF ROOMS OR PARTS OF A HOUSE OR A BUILDING

This invention relates to a system for simultaneous supervision or monitoring of rooms of a house or a building from a remote place so as to readily determine whether an accident has occured or an abnormal condition exists as well as the presence or absence of persons in the rooms.

More particularly, the invention concerns with a method and an apparatus for simultaneously supervising and monitoring rooms of a house or a building including detection of the locking of doors, operation of alarms inside or outside the rooms, over or under flow of water in water supply or drainage equipments, and the operation or non-operation of motors and elevators. Information regarding such incidents is electrically detected by a signal transmission device on a continuous basis and the results delivered to a signal receiving device at a remote location where the information is readily determined.

BACKGROUND OF THE INVENTION

The enormous development of cities has recently increased the number of houses and buildings with each growing much larger in the scale of construction. Each house or building generally contains a large number of rooms or compartments which require frequent and efficient patroling by guards and, accordingly, such patroling has become a difficult task for the guards for preventing fire or other accidents.

In a large building where shops, offices and even amusement centers are congregated together each having different business hours, there is the disadvantage that the guards must supervise or patrol all individual rooms at varied hours to meet the need of such shops or business offices.

This has necessitated as many guards as required for the inspection and supervision and thus resulted in an unavoidable increase in the number of personnel against the recent trend of automatic management of buildings and reduction of guards.

SUMMARY OF DESCRIPTION OF THE INVENTION

This invention relates to a system for the supervision or monitoring of the rooms of a house or a building without patrol or inspection by guards, such supervision or control being performed electrically and simultaneously from one place.

Therefore, a primary object of the present invention is to provide a system for supervising or monitoring the normal or abnormal condition of rooms or equipments of a house or a building without the need for patrol guards for the efficient prevention of accidents or calamities.

Another object of the invention is to provide an apparatus which can supervise or monitor rooms of a building without patrol, the detection of absence or presence of persons in rooms or locking or unlocing of doors being continuously indicated by the apparatus of the invention.

A further object of the invention is to provide a method and an apparatus which enables reliable supervision or monitoring of rooms of a house or a building as being normal or not normal and the absence or presence of persons in the rooms simultaneously from a remote place.

A still another object of the invention is to provide an apparatus which includes a signal transmission device for detecting the normal or not normal condition of rooms and a signal receiving device for receiving information of such normal or not normal condition of rooms, these devices being connected together, whereby the normal or not normal condition can be visually observed directly at the same time from a remote place.

According to the invention, there is provided a system for concentrically supervising or monitoring rooms of a house or a building in order to detect the occurence of accidents, absence the or presence of persons or any other calamities which occur in the rooms. Information from information receiving means respectively provided in rooms or equipments of a building are supplied to the gates of an input gate group in the signal transmission device and respectively responsive to the above information receiving means, the gate group is scanned so that an output signal is produced for each gate in sequence.

The output signal is applied to a discriminator circuit which detects whether said output signal is normal or not normal. A normal signal is transmitted to the signal receiving device without modifying the pulse duration of a pulse from a pulse generator in the signal transmission device whereas for an abnormal signal the duration of a pulse produced by the pulse generator is increased.

In the signal receiving device, a signal supplied from the signal transmission device is again applied to a discriminator circuit to determine whether it is normal or not and then in accordance with the order of scanning the signal is indicated as being normal or not normal on an indicator, according to the information received by the information receiving means in the signal transmission device. The signals displayed on the indicator are detected and observed from a remote place inside or outside the building.

These an other objects and advantages of the present invention are all attained by use of the mechanical parts, electrical circuits and the operation of such parts and circuits, the detailed description of which will be made on a preferred embodiment with reference to the accompanying drawings.

REFERENCE TO THE DRAWINGS

DETAILED DESCRIPTION OF THE INVENTION

The method and apparatus according to the present invention will be described in details below with reference to the drawings.

Figure 1:
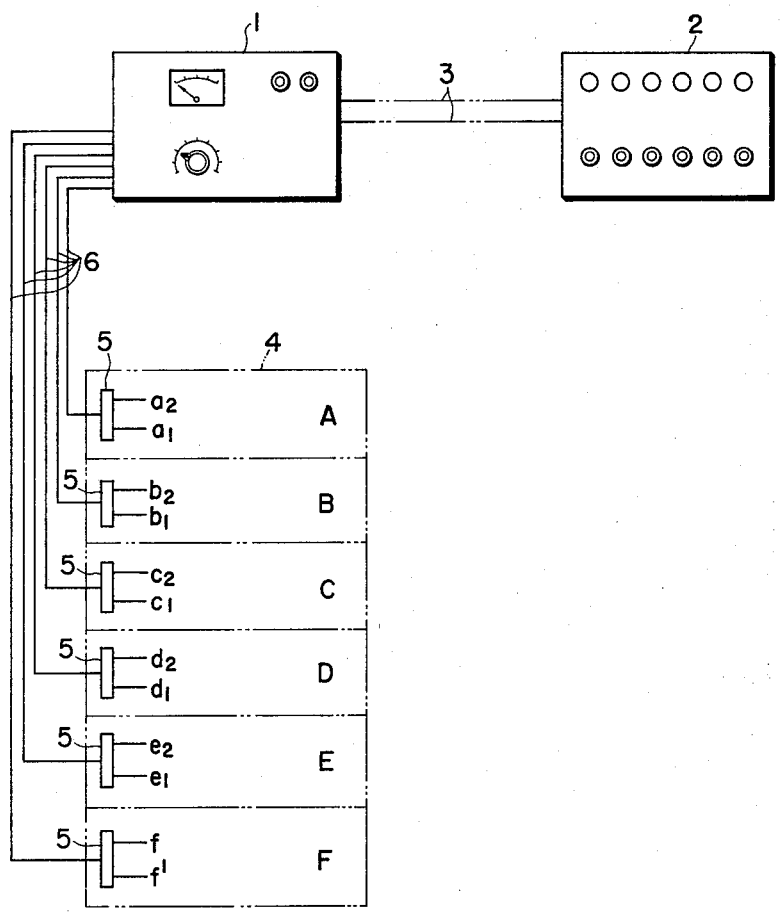
FIG. 1 is a diagram showing a system according to the present invention.

Referring now to FIG. 1, numeral 1 designates a signal transmission device, 2 a signal receiving device, 3 a signal transmission line, 4 a building, 5 an input board, and 6 a signal line.

Assume that a building 4, for example, has five rooms A to E which need supervision and control. A room A, for instance, is provided with an information receiving means $a_1$ which can report opening or closing of a room by a door lock and the presence or absence of persons for crime prevention and an information receiving means $a_2$ to report fire or gas accidents by sensors, these two means forming an information acquiring means. The same supervision and control may be required for the rooms B to E, that is, for instance, the room B may be provided with information receiving means $b_1 - b_2$ and room C with information receiving means $c_1 - c_2$ and so forth respectively. As a means commonly serviceable for the entire building, there are provided in F room an information receiving means ($f$) in an elevator or the like to supervise its normal or not normal condition (in case, a person is shut in the elevator), and another information receiving means ($f'$) is used as a crime prevention information means such as provided in galleries.

Information obtained from the information receiving means in respective rooms enter an input board 5 and are modified there into normal or not normal signals. The signals then are passed through signal line 6 and applied to the signal transmission device 1.

In the signal transmission device 1, the information forwarded from the signal line 6 is successively scanned in sequence and each information signal is detected to determine whether it is normal or not. The signal obtained after such detector or discrimination is transmitted to a signal receiving device 2 through a transmission line 3 as a modified pulse.

The signal receiving device 2 detects the delivered pulse signal to determine whether it is normal or not. The above signal receiving device successively scans over an indicator operating responsively to the rooms A to E of the building 4 in accordance with the result of discrimination as above described so as to detect and indicate a normal or not a normal condition. It is therefore desirable to provide a signal transmission device 1 at every required location outside a room or inside a building 4 to supervise the condition of the entire building.

The signal receiving device 2 can have a signal transmission line (with a established telephone line or a private line being used) and may be equipped in any other building or control location, whereby simultaneous supervision monitoring of the building may be made effectively from a remote place. Such a signal receiving device 2 placed in a number of buildings may be operated from the same control location to facilitate the simultaneous supervision of many buildings. In a massive building, the signal transmission device 1 and signal receiving device 2 may be provided together in a control location in the building.

Figure 2:
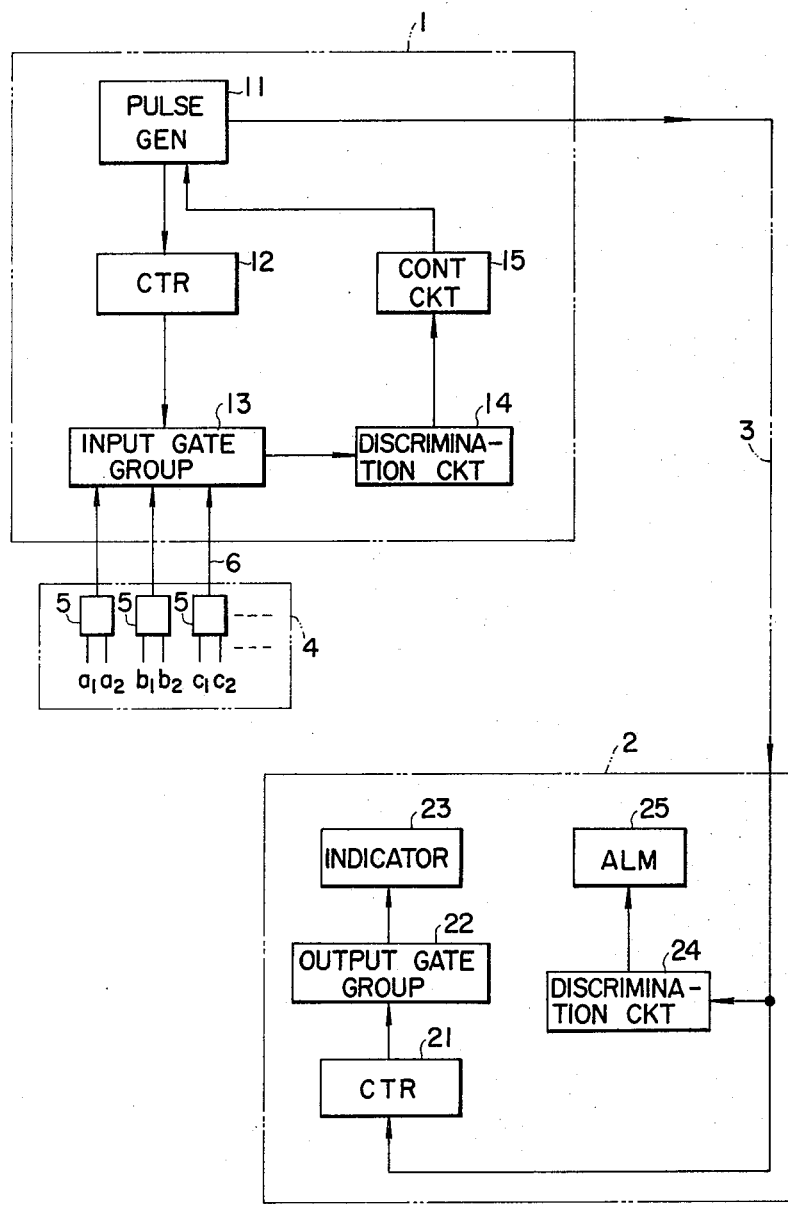
FIG. 2 is a block diagram showing the principle of operation of a system according to the invention.

Operation of the present invention will now be illustrated with reference to the block diagram of FIG. 2.

In the diagram, reference numerals 1 to 6 correspond to 1 to 6 of FIG. 1.

The signal transmission device includes a pulse generator 11 which produces a train of pulses at a predetermined frequency, a counter 12 which is stepped by the pulses, and an input gate group 13 which is scanned by the output of the counter 12. The input gate group 13 consists of a large number of gates each being applied an input signal from the signal line 6 leading from the input board 5. The discrimination circuit 14 connected to the input gate group 13 detect the output from the input gate group 13 to determine whether it is normal or not and produces an output which controls the control circuit 15. The control circuit 15 can modify the pulse duration of the pulses produced by pulse generator 11 according to the discrimination output as described above. The forwarded pulses from the transmission line 3 of different duration depending on whether the discriminator output is normal or not. The information signals are produced successively, i.e., in sequence, by scanning of the counter 2 although a number of such information signals are applied simultaneously to the input gate group 13.

The signal receiving device 2 includes a counter 21 which steps or counts up forwardly with every input pulse, an output gate group 22 scanned by output of the counter 21, an indicator 23 responsive to the gates, a discrimination circuit 24 for determining whether an input pulse is normal or not, and an alarm 25 operating when the output of the discrimination circuit 24 is not normal. The signal receiving device 2 thus makes it possible to know the condition of places as required for the supervision and control of the building 4.

Figure 3:
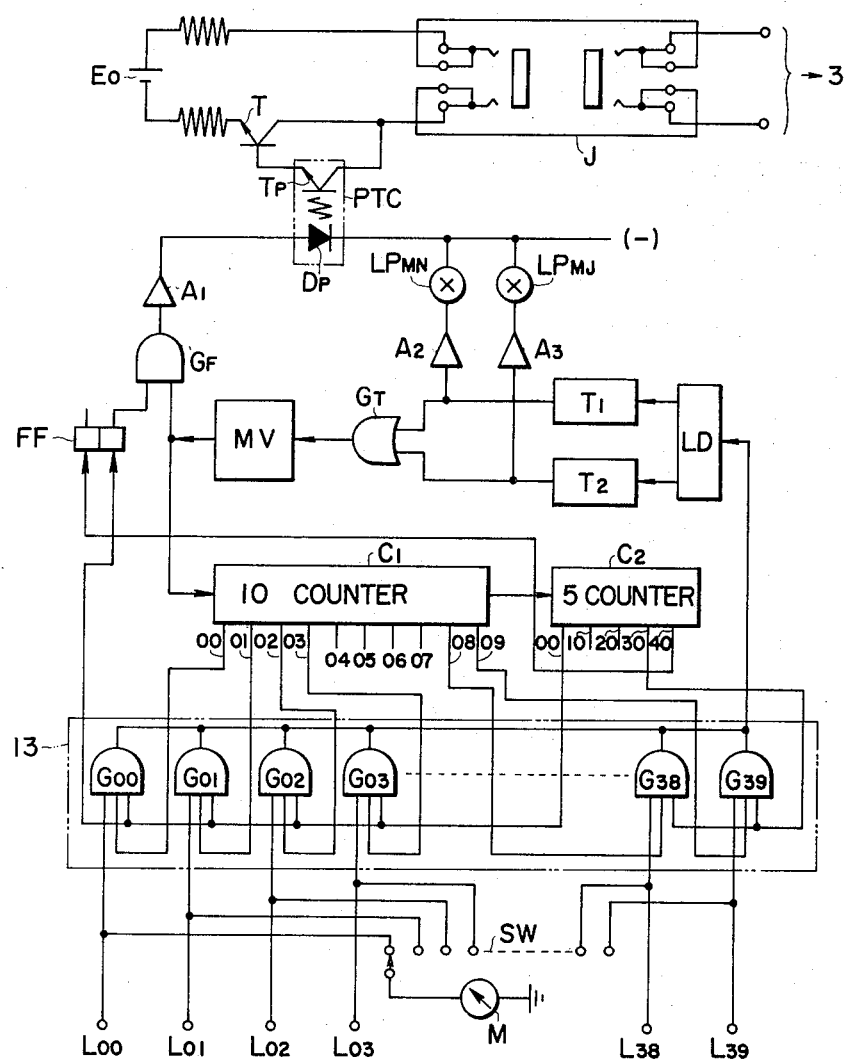
FIG. 3 is a circuit diagram of an embodiment of a signal transmission device of the invention.

With reference to FIG. 3, an embodiment of a circuit of the signal transmission device is illustrated. In the drawing, the circuit includes AND-gates $G_{00} - G_{39}$ forming the input gate group 13. One of the input signals applied to the above gates is the applied signals from the signal lines $L_{00} - L_{39}$ which are issued respectively from the rooms. Another input signal is an output signal of the counter $C_1$ in the units column and still another input signal is an output of the counter $C_2$ in the tens column. Block MV shows a multivibrator which oscillates a pulse of 10 $H_z$ and which is in turn applied to the counter $C_1$. When the counter $C_1$ advances from 00 to 09 and again returns to 00, then the counter $C_2$ turns from 00 to 10. Accordingly, if 28 is counted by the counter $C_1$ and counter $C_2$, the above three inputs are applied to the gate $G_{28}$ at the same time. Then the output of the gate $G_{28}$ is transmitted to a level detector LD.

In the information receiving means, the information receiving means $a_1$ for the detection of opening or closing of the door lock produce a voltage such as 0 Volt in an abnormal time and 3 Volt in a normal time. The fire and accident information receiving means $a_2$, elevator information receiving means ($f$) and crime prevention information receiving means ($f'$) are set up previously at 10 Volt in not normal time and 3 Volt in normal time. Therefore, in time when signal lines are in normal condition, the signal lines $L_{00} - L_{39}$ each will issue 3 Volt which is then applied to a corresponding AND-gate.

Preferably the signal lines $L_{00}-L_{30}$, 31 in total, are used for monitoring the rooms and the signal lines $L_{31} - L_{39}$ for common equipments such as elevator information receiving means ($f$) or crime prevention information receiving means ($f'$) in galleries.

The level detector LD detects the levels of the outputs of gates $G_{00} - G_{39}$ but issues no alarm if the normal output is 3 Volt. If the output is not normal, the detector operates timer $T_1$ or timer $T_2$ depending on whether the output is 0 Volt or 10 Volt. Then, if the abnormal signal is found to be 0 Volt, the timer $T_1$ will operate for three seconds. This output is applied through an OR-gate $G_T$ to the multivibrator which is stopped for three seconds. Also, if the abnormal signal is 10 Volt, the timer $T_2$ will operate for 15 seconds and during this period the multivibrator MV is stopped for 15 seconds. The AND-gate GF is operated when output of flip-flop FF and that of multivibrator MV both are applied thereto simultaneously, the output of the AND-gate being amplified by amplifier $A_1$ and forwarded to luminance diode $D_p$ to cause energization thereof. The luminescent radiation from diode $D_p$ falls on a phototransistor $T_p$ which is conducting and results in the conductance of transistor T, whereby a DC voltage from a DC source $E_0$ is forwarded to the signal transmission line 3 through jack J.

In synchronism with the output waveform of 10 Hz of the multivibrator MV, the line current through the signal transmission line 3 is disconnected by a photoresistor $T_p$ of a photo-coupler PTC and converted to a pulse. As described above, when the timer $T_1$ and timer $T_2$ are operated, the width of the pulse between the timers is made to increase, that is, the width of the pulse as transmitted makes it possible to detect the abnormal signal.

When the timer $T_1$ and timer $T_2$ are operated, either the amplifier $A_2$ or amplifier $A_3$ is actuated to cause the indicator lamp $Lp_{MN}$ of a minor alarm (3 seconds) or the indicator lamp $Lp_{MJ}$ of a major alarm (15 seconds) to be energized to inform an operator of the occurrence of an abnormal condition.

In the drawing, M denotes a meter. With a rotary switch SW set on, the voltage of the signal lines $L_{00} - L_{39}$ can be read in a preferred location as desired.

The counter $C_1$ and counter $C_2$ can make 50 counts (5 seconds) but during the period of 40 – 49 counts (1 second), the flip-flop FF is reset by closing the AND-gate $G_F$ for the photocoupler, so that the transmission line does not produce any signal during the period of 10 counts (1 second).

As later described, it is because of this that the counters in the signal transmission and receiving devices are synchronized.

Figure 4:
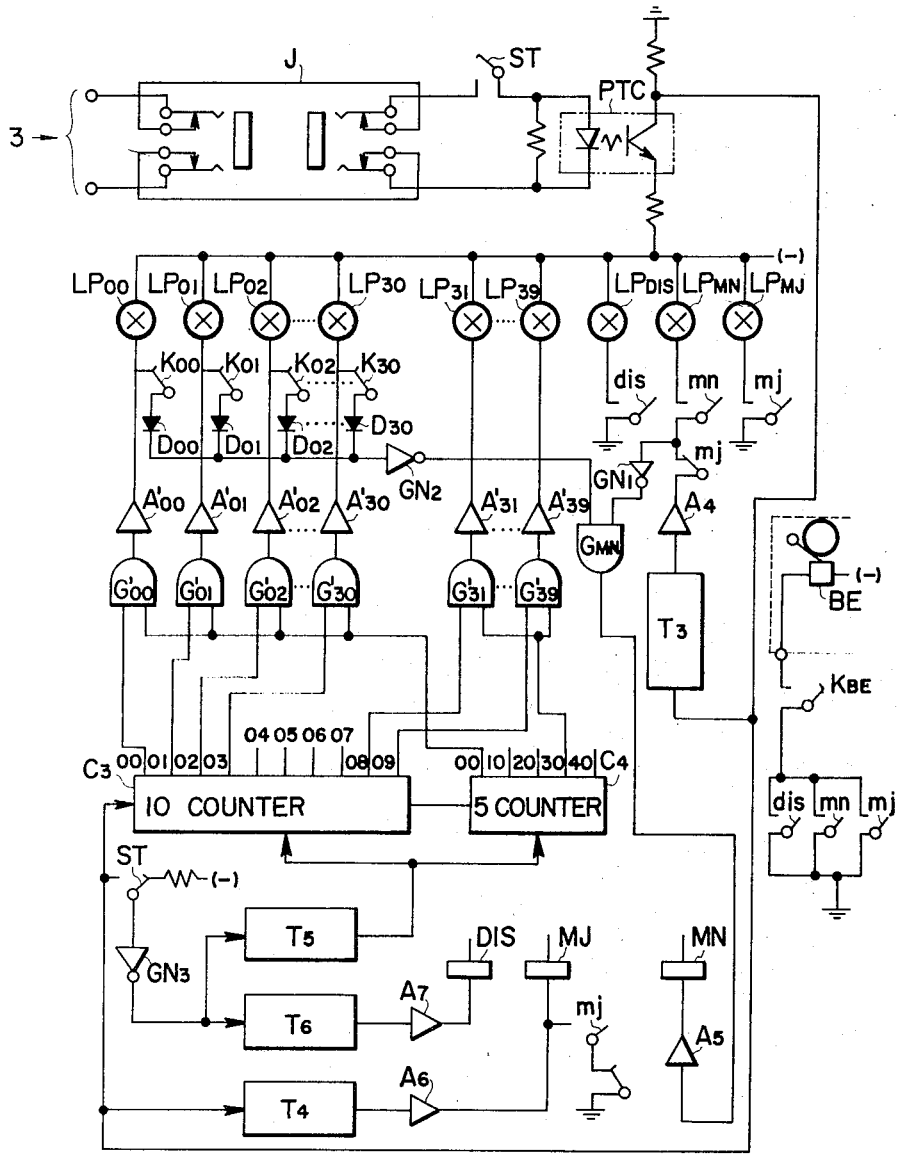
FIG. 4 is a circuit diagram of an embodiment of a signal receiving device of the invention.

FIG. 4 is a circuit diagram of an embodiment of the signal receiving device. Construction and operation of the circuit are set forth below. The forwarded pulse from the transmission device passes from the signal transmission line 3 through the jack J and start switch ST to the photocoupler PTC and transmitted to the signal receiving device. The described pulse is applied to the counter $C_3$ which, with the output counter $C_4$, counts 00 – 39, and during the counting period 40 – 49, repeats the quiescent action of the signal of the transmission device. Thus, by the combined operation of the counter $C_3$ and counter $C_4$, pulses produced as described will be applied in sequence to corresponding gates, of the gates $G'_{00} - G'_{39}$ which form an output gate group. The output of the of the pulse obtained is amplified by amplifiers $A'_{00} - A'_{39}$ and the amplifiers light up the indication lamps $Lp_{00} - Lp_{39}$. For instance, if an information signal is forwarded showing an abnormal condition of the door lock through the signal line $L_{12}$ from the transmission device, the timer $T_1$ in the signal transmission device is operated so that a line current flows in the transmission line for three seconds and the indication lamp $Lp_{12}$ holds a lighted condition for three seconds. If no abnormal condition is found, the multivibrator MV of 10 Hz (10 times a second) in the signal transmission device counts 50 in five seconds so that the "on" or lighting time of one indication lamp is 0.1 second. Therefore, from the time during which an indication lamp is lit, it is possible to determine directly which room is in an abnormal condition.

When the abnormal signal is detected, the timer $T_3$ is actuated. The timer is actuated when a pulse of a width for two seconds or more is detected and output of the timer $T_3$ is amplified by amplifier $A_4$ and applied from a contact mj to an inverter $GN_1$. The output from the inverter $GN_1$ is further applied to gate $G_{MN}$.

Indication lamps $Lp_{00} - Lp_{30}$ are provided respectively with electrical keys $K_{00} - K_{30}$ which can be set up as desired, while the output of the amplifiers $A'_{00} - A'_{30}$ are applied respectively through diodes $D_{00} - D_{30}$ to an inverter $GN_2$.

Accordingly, the output of the diodes $D_{00} - D_{30}$ is applied to gate $G_{MN}$ which is by output of the inverter $GN_1$ applied simultaneously to gate $G_{MN}$. Then the output of the gate $G_{MN}$ is amplified by amplifier $A_5$ to actuate a relay MN. Therefore, contact mn is closed to energize or light an indication lamp $Lp_{MN}$.

In case of an abnormal signal or emergency information signal, where the width of an input pulse is more than 15 seconds, an output appears in the inverter $GN_3$ to actuate the timer $T_3$ and thereafter timer $T_4$.

Thus a relay MJ operates through amplifier $A_6$, the contact mj of which is closed to light or energize an indication lamp $Lp_{MJ}$ and extinguish an indication lamp $Lp_{MN}$.

Timer $T_5$ detects the disconnection of line current on the transmission line and is actuated when such disconnection continues over 0.8 seconds so as to reset the counter $C_3$ and the counter $C_4$, that is, return the counters to a start position.

As described in the above, the line current is disconnected while the counter counts 40 – 49. This counting period of time is 1 second. The disconnection occurs at the end of each counting cycle, that is, before one scanning period. If such operation is detected by the timer $T_5$ and the counter $C_1$ and counter $C_2$ are to be reset, it is possible to completely synchronize the signal receiving and transmission devices. When the line is disconnected or the source of signal transmission is disconnected, the inverter $GN_3$ produces an output. By this output a timer $T_6$ actuates and the output is amplified by amplifier $A_7$ to operate the relay DIS and close its contact (dis) to energize an indication lamp $Lp_{DIS}$. In the case of alarm conditions, the electrical key $K_{BE}$ which has been set up previously will ring the bell BE.

Figure 5:
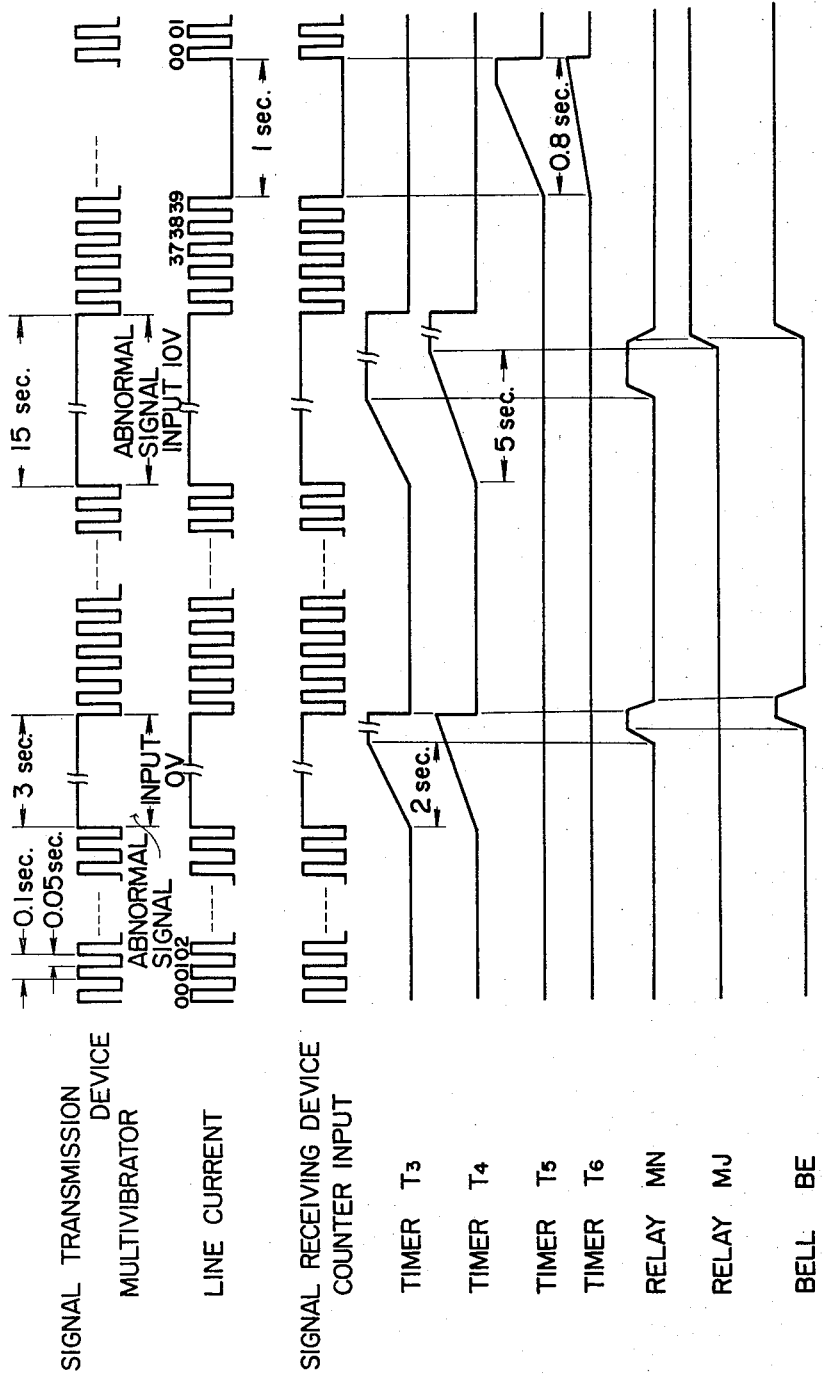
FIG. 5 is a time chart representing the circuit diagram of FIGS. 3 and 4.

FIG. 5 shows a time chart for the operation of the signal receiving and transmission devices as shown in FIGS. 3 and 4.

Figure 6:
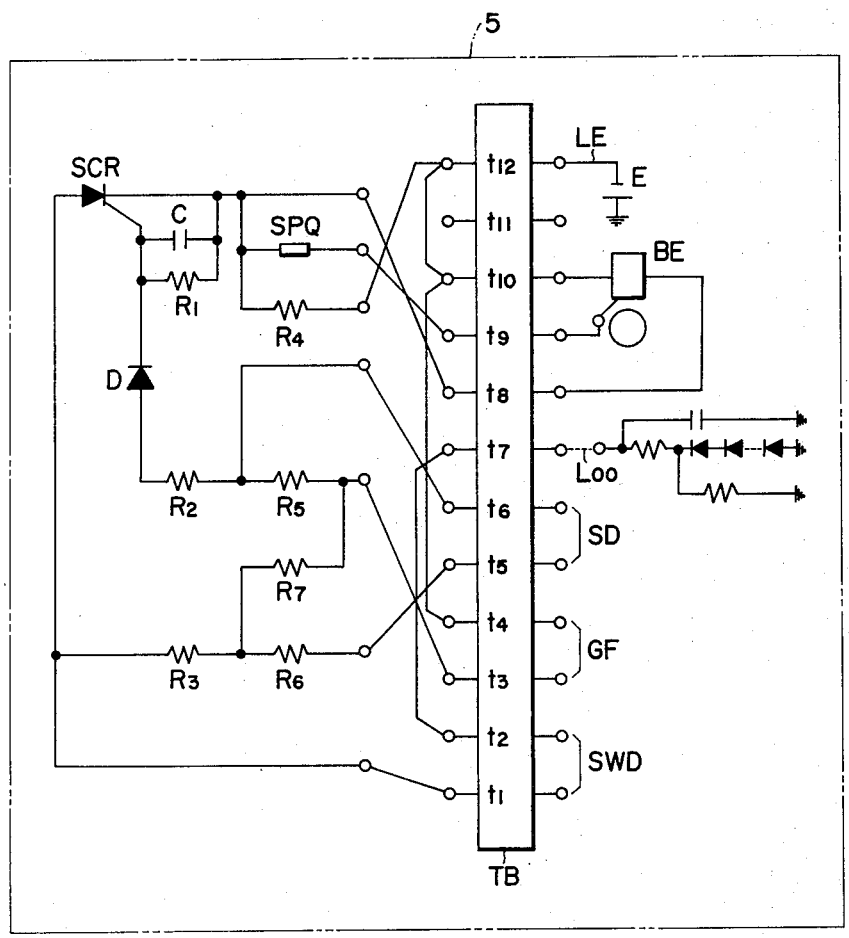
FIG. 6 shows an embodiment of an input board of a signal transmission device of the invention.

FIG. 6 is a circuit diagram of an embodiment of the input board 5 of FIG. 1. In the diagram, terminal board TB is provided with terminals $t_1 - t_{12}$, the terminal $t_{12}$ being connected with a power source line LE and the terminal $t_7$ with a signal line, for example, $L_{00}$ of FIG. 3. Between the terminals $t_1$ and $t_2$ is connected a door switch SWD which closes a contact when a door is closed. Between the terminals $t_3$ and $t_4$, there is connected a breaking conductor GF located within a vacuum evaporated glass rod. Between the terminals $t_5$ and $t_6$, a contact SD of a smoke sensor may be connected for closing the circuit responsive smoke from a fire.

There is provided a thyrister control circuit including resistors $R_1 - R_7$, a spacular SPQ, a thyrister SCR, a diode D, and a condenser C.

When no abnormal condition is found in rooms, the signal line $L_{00}$ issues an output of 3 Volt. When a door switch SWD is set ON by opening of a door, the signal line $L_{00}$ may issue an input of 0 Volt. If the breaking conductor GF is broken or smoke sensor operates to close its constant SD, the signal line $L_{00}$ will issue an output of 10 Volt.

The embodiment of FIG. 6 shows the input boards in the rooms of FIG. 1. The elevator information means is not shown but the circuitry thereof is of similar construction and operation.

The apparatus of the invention thus enables the concentric supervision and control at one place of all informations in a room or part of a building through electrical connection and control between the signal receiving and transmission devices, the apparatus thereby being adapted to provide monitoring from a remote place through an extension of a signal transmission line.

The apparatus can save guard men for patrol and secures accurate and rapid supervision of rooms.

Furthermore, transmission of a signal having an output which is effectively disconnected during every scanning in the signal transmission device serves for complete synchronization of signals between the signal receiving and transmission devices. The signal transmission device of the invention can therefore provide normal and abnormal signals as previously set up from the voltage difference of the DC current which is detected to control the pulse generation.

Therefore, the system of the invention is of has greatly simplified the construction. In the system, the signal receiving device in particular is designed to operate the indicator in response to the length of time for the abnormal signal when the received signal is abnormal, as detected by a timer, thereby making it possible to determine the abnormal condition directly from time during which the indicator is energized.

Automatic and reasonable supervision of large buildings as well as supervision of small and medium sized buildings may be secured without using guards but with remarkable effect.

What is claimed is:

1. A system for simultaneously supervising or monitoring a plurality of rooms or other parts of house, building or the like, said system comprising means for receiving room condition signals from the rooms under supervision indicative of "normal" or "not normal" conditions within the rooms, said signal receiving means including a plurality of gates individual to the rooms under supervision each having one input connected to receive a said room condition signal from the room associated therewith the individual outputs of said gates being connected together to form a common output; scanning means for scanning said gates in sequence so that the individual outputs of said gates appear at said common output in said sequence; pulse generator means; control means connected to the common output of said gates for controlling the pulse duration of the pulses produced by said pulse generator means in sequence in accordance with the outputs of the individual gates so that the duration of a said pulse is increased for "not normal" room condition signal; and display means including an array of a plurality of indicator lamps, individually associated with the rooms under supervision and corresponding to said plurality of gates, which are energized responsive to the output of said pulse generator means so that said lamps in said array are energized in sequence corresponding to the sequence in which said gates are scanned and the time period which each said lamp is energized is dependent upon the pulse duration of the pulse produced by said pulse generator means and hence upon the room condition signal received by the gate associated therewith.

2. A system as claimed in claim 1 wherein different voltage levels of said room condition signals are indicative of said "normal" and "not normal" conditions, said control means including voltage level detection means.

3. A system as claimed in claim 1 wherein said signal receiving means, said scanning means, said pulse generator means and said control means are included in a transmitter, and said display means is included in a receiver connected to the output of said transmitter, said receiver further comprising counting means for counting up responsive to each of said pulses received from said pulse generator means and a further plurality of gates which are rendered conductive in sequence responsive to the output of said counting means, said indicator lamps being individually connected to the output of a corresponding gate of said further plurality of gates.

4. A system as claimed in claim 3 wherein said scanning means includes further counter means which count up responsive to individual pulses from said pulse generator means, the D.C. voltage level of the room condition signals indicating said "normal" and "not normal" conditions and said control means comprising a voltage level discriminator for determining the voltage levels of the outputs of the transmitter gates, and timing means responsive to the output of said discriminator for controlling the operating state of said pulse generator means for a predetermined period, when the voltage levels detected by said discriminator indicate "not normal" conditions, so as to generate a pulse of a duration corresponding to said predetermined period.

5. A system as claimed in claim 4 further comprising alarm means responsive to said timing means.

6. A system as claimed in claim 4 wherein said room condition signals include at least two different "not normal" voltage levels indicating two different "not normal" conditions, said timing means includes at least two timers for individually controlling the said pulse generator means to provide pulses of two different durations corresponding to the two "not normal" conditions.

7. A system as claimed in claim 3 wherein said transmitter produces a synchronizing signal duration a predetermined portion of the cycle of operation thereof, said receiver including means for receiving said synchronizing signal and resetting the receiver counting means responsive thereto so as to synchronize said transmitter with said receiver.

* * * * *

UNITED STATES PATENT OFFICE
CERTIFICATE OF CORRECTION

Patent No. 3,812,492  Dated May 21, 1974

Inventor(s) MOTOHIRO GOTANDA

It is certified that error appears in the above-identified patent and that said Letters Patent are hereby corrected as shown below:

On the cover page, that portion identifying the inventor and his address should read --Motohiro Gotanda, No. 3-6-29, Inokashira, Mitaka-City, Tokyo, Japan--.

Signed and sealed this 19th day of November 1974.

(SEAL)
Attest:

McCOY M. GIBSON JR.
Attesting Officer

C. MARSHALL DANN
Commissioner of Patents